April 2, 1929.
C. C. FARMER
1,707,259
FLUID PRESSURE BRAKE
Filed Oct. 21, 1926
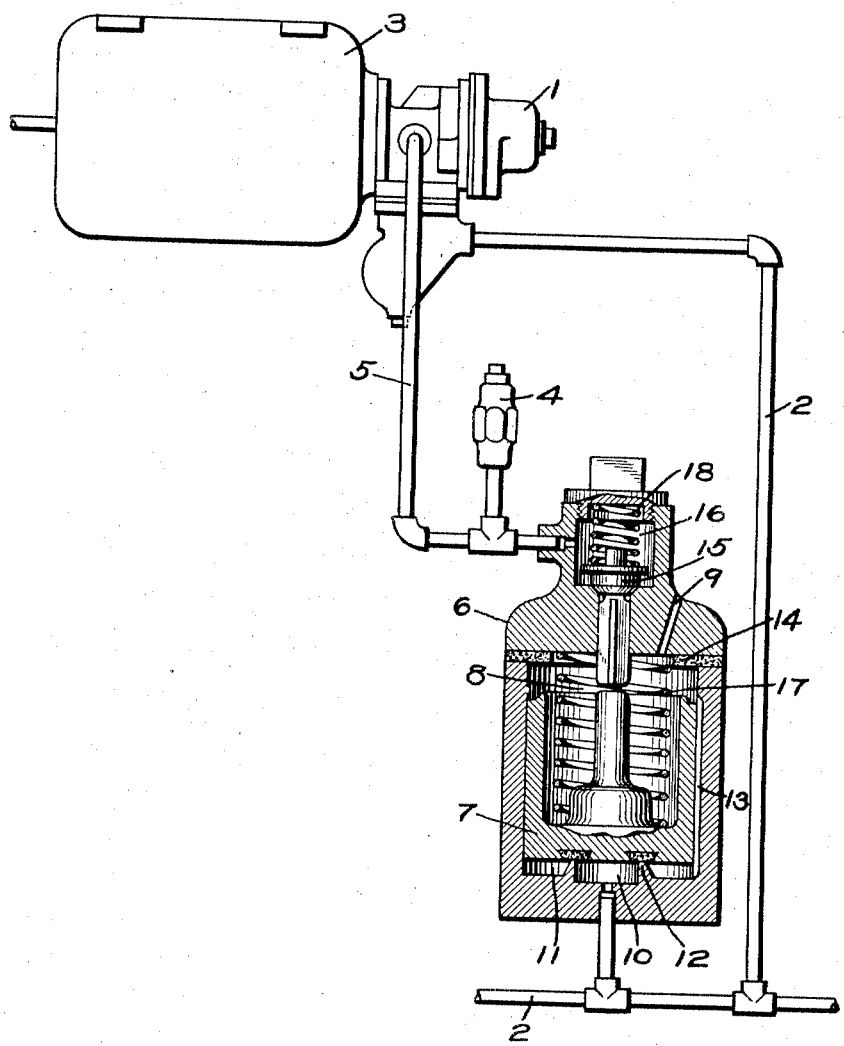
INVENTOR
CLYDE C. FARMER
BY *Wm. M. Cady*
ATTORNEY Patented Apr. 2, 1929.

1,707,259

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 21, 1926. Serial No. 143,154.

This invention relates to fluid pressure brakes, and more particularly to means for retaining fluid under pressure in the brake cylinder, in the operation of releasing the brakes.

In the running of railway trains, when descending grades, it is desirable to retain a certain degree of fluid pressure in the brake cylinders when the brake pipe pressure is increased, in order to permit the recharge of the auxiliary reservoirs without releasing the brakes.

The principal object of my invention is to provide means, under the control of the engineer, whereby the brake cylinder pressure retaining means may be cut in for operation on grades, and cut out for operation in level road service.

In the accompanying drawing, the single figure is a view of a fluid pressure brake equipment, showing my invention applied thereto.

As shown in the drawing, the brake equipment may comprise a triple valve device 1, connected to the usual brake pipe 2, an auxiliary reservoir 3, a retaining valve device 4, connected to the triple valve brake cylinder exhaust pipe 5, and a control valve device 6.

The control valve device 6 may comprise a casing containing a valve piston 7, having at one side a chamber 8 connected to the atmosphere through an exhaust port 9 and at the opposite side, when the valve piston 7 is in engagement with a seat ring 12, a chamber 10, at the inner area of said seat ring, in constant communication with the brake pipe 2, and chamber 11, at the outer area of the seat ring 12, is connected to chamber 8, at the opposite side of valve 7, by way of port 13.

When the valve piston 7 is in the opposite position to that shown in the drawing and sealing against a gasket 14, the chambers 10 and 11 are connected together and the upper end of port 13 is closed.

The control valve device 6 also includes a valve 15, contained in chamber 16 and operable by the valve piston 7, for controlling communication from the brake cylinder exhaust pipe 5 to the atmosphere, through the exhaust port 9.

A spring 17, contained in chamber 8, is adapted to hold the valve 7 seated against the seat ring 12, unless the brake pipe pressure is increased above a predetermined degree.

In operation, it is proposed that a lower brake pipe pressure be carried when operating on a grade, than is carried when operating on a level, such, for example, as 70 pounds brake pipe pressure in grade service and 90 pounds brake pipe pressure in level service.

The control valve device 6, is shown in the drawing as in the operative position for grade service, the brake pipe pressure of 70 pounds for grade service, acting in chamber 10 against the valve piston 7, being insufficient to shift said valve piston away from the seat ring 12 against the pressure of spring 17.

The valve 15 is held seated by the pressure of spring 18, so that communication between the triple valve brake cylinder exhaust pipe 5 and the atmosphere, through exhaust port 9, is closed.

Thus, in grade service, when the triple valve device is shifted to release position, fluid under pressure from the brake cylinder can only vent through the retaining valve device 4, and thus a certain degree of pressure is retained in said brake cylinder while the auxiliary reservoir 3 is being recharged.

If it is desired to operate the train on a level road, the pressure of the fluid in the brake pipe 2 is increased above the 70 pounds employed in grade service, and thereby the pressure in chamber 10 is increased so as to overcome the pressure of spring 17. The valve piston 7 is therefore moved from engagement with the seat ring 12, exposing the full area of said valve piston to brake pipe pressure, which causes a rapid movement of said valve piston to its seat against the gasket 14, in which position the upper end of passage 13 is closed.

The upward movement of valve piston 7 causes the valve 15 to be opened, so that in releasing the brakes, when the triple valve device moves to release position, the brake cylinder exhaust pipe 5 is connected directly to the atmosphere through chamber 8 and exhaust port 9, so that the retaining valve device 4 is not effective to retain pressure in the brake cylinder.

With the control valve device 6 in position for operation in level road service, in order to adjust for operation on a grade, the parts of the control valve are so proportioned that it is necessary to reduce the brake pipe pressure below the equalizing point before downward movement of the valve piston 7 will be effected, such as a reduction in excess of 23 pounds from the 70 pounds brake pipe pressure. When the lower brake pipe pressure is obtained, the pressure of spring 17 is sufficient to start the valve piston 7 moving away from the gasket 14 towards the seat ring 12. The initial downward movement of said valve opens the connection between chamber 8 and passage 13 so that fluid at brake pipe pressure in chambers 10 and 11 may flow into chamber 8 and supplement the pressure of spring 17 in pushing the valve 7 to its seat 12. The valve piston 7 then quickly moves down and seals against seat ring 12. Chamber 11 is then connected to atmosphere through the exhaust port 9.

The movement of valve piston 7 to its lower position against the seat ring 12 permits the spring 18 to seat the valve 15 so as to close communication between the triple valve brake cylinder exhaust pipe 5 and the atmospheric exhaust port 9, so that the exhaust from the brake cylinder is then controlled by the retaining valve device 4.

Having now described my invention, what I claim as new and desire to secure by Letters Patent, is:—

1. In a fluid pressure brake, the combination with a brake pipe, brake cylinder, and triple valve device, of a valve device for controlling communication from the brake cylinder exhaust port of said triple valve device to an atmospheric exhaust port and operated upon an increase in brake pipe pressure above a normal pressure carried in the brake pipe for opening communication from the brake cylinder exhaust port to said atmospheric exhaust port, said valve device being operated only upon a reduction in brake pipe pressure below the normal equalizing point for closing communication from said brake cylinder exhaust port to said atmospheric exhaust port.

2. In a fluid pressure brake, the combination with a brake cylinder, brake pipe, and triple valve device, of a valve device for controlling communication from the brake cylinder exhaust port of said triple valve device to an atmospheric exhaust port and operated at one normal brake pipe pressure for closing communication from the brake cylinder exhaust port to the atmospheric exhaust, at another higher normal brake pipe pressure for opening communication from the brake cylinder exhaust port to the atmospheric exhaust port, and operated upon a predetermined reduction in brake pipe pressure below said higher normal brake pipe pressure for closing communication from said brake cylinder exhaust port to the atmospheric exhaust port.

In testimony whereof I have hereunto set my hand.

CLYDE C. FARMER.